UNITED STATES PATENT OFFICE.

WALTER G. CLARK, OF NEW YORK, N. Y., ASSIGNOR TO PARKER-CLARK ELECTRIC COMPANY, OF JERSEY CITY, NEW JERSEY, A CORPORATION OF NEW JERSEY.

PROCESS OF MAKING INCANDESCENT-ELECTRIC-LAMP FILAMENTS.

963,745. Specification of Letters Patent. Patented July 12, 1910.

No Drawing. Application filed April 5, 1906. Serial No. 309,993.

*To all whom it may concern:*

Be it known that I, WALTER G. CLARK, of the city, county, and State of New York, have invented a new and Improved Process of Making Incandescent-Electric-Lamp Filaments, of which the following is a full, clear, and exact description.

My invention relates to improvements in filaments for incandescent electric lamps, and the object of my invention is to coat a filament with silica so as to prevent any ionization of the filament or any deterioration by reason of its throwing off emanations. By coating the filament with silica, no emanations can be thrown off and the lamp globe is kept clean. This is desirable because the ordinary temperature of incandescence is not sufficient to melt the silica.

My invention is an improvement on Letters Patent of the United States No. 876,331 dated January 14th, 1908, and on United States Letters Patent No. 876,332 dated January 14th, 1908.

In carrying out my invention I deposit silicon on a carbon filament in accordance with the method set out in the patents above referred to, that is I flash a carbon filament in an atmosphere containing tetra-chlorid of silicon, a hydro-carbon gas, and olefiant gas which serves as an absorbent for the chlorin freed by the flashing process, and after the silicon surface begins to appear and while the silicon is being deposited, a little oxygen is admitted into the presence of the filament and the silicon surface will thus be oxidized sufficiently to convert it into silica. Only a very little oxygen is needed, and by regulating the amount, the oxidation can be carried inward to the necessary extent so that in this way the silica coating can be regulated.

Having thus fully described my invention, I claim as new and desire to secure by Letters Patent:—

1. The herein described process of making incandescent lamp filaments, which consists in flashing a filament in an atmosphere containing a hydro-carbon gas, a silicon chlorid, and an absorbent for the chlorin freed by the flashing process and the admission of oxygen to said atmosphere.

2. The herein described process of making incandescent lamp filaments, which consists in flashing a carbon filament in an atmosphere containing a hydro-carbon gas, a silicon chlorid, and an absorbent for the chlorin freed by the flashing process, and oxidizing the silicon while it is being deposited upon the filament.

3. The herein described process of making electric lamp filaments, which consists in flashing a carbon filament in an atmosphere containing a hydro-carbon gas, a silicon chlorid and olefiant gas, and the admission of oxygen to said atmosphere, whereby the silicon as deposited upon the filament is oxidized into silica.

WALTER G. CLARK.

Witnesses:
WARREN B. HUTCHINSON,
FRANK L. STUBBS.